United States Patent
S Nanal et al.

(10) Patent No.: US 10,960,541 B2
(45) Date of Patent: Mar. 30, 2021

(54) ANALYTICAL ROBOTIC PROCESS AUTOMATION

(71) Applicant: ACCENTURE GLOBAL SOLUTIONS LIMITED, Dublin (IE)

(72) Inventors: Mihir S Nanal, Pune (IN); Vinitha Sunodh, Pune (IN); Sachin Narayan Lokhande, Navi Mumbai (IN); Avilash Jena, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 35 days.

(21) Appl. No.: 16/258,154

(22) Filed: Jan. 25, 2019

(65) Prior Publication Data

US 2020/0180148 A1 Jun. 11, 2020

(30) Foreign Application Priority Data

Dec. 10, 2018 (IN) .............................. 201811046630

(51) Int. Cl.
| | | |
|---|---|---|
| *B25J 9/16* | (2006.01) | |
| *G06K 9/62* | (2006.01) | |
| *G06F 11/36* | (2006.01) | |
| *G05B 19/042* | (2006.01) | |

(52) U.S. Cl.
CPC .......... *B25J 9/163* (2013.01); *G05B 19/0423* (2013.01); *G06F 11/3672* (2013.01); *G06K 9/6276* (2013.01)

(58) Field of Classification Search
CPC .. B25J 9/163; G05B 19/0423; G06F 11/3672; G06K 9/6276
See application file for complete search history.

(56) References Cited

U.S. PATENT DOCUMENTS

| | | | |
|---|---|---|---|
| 2003/0202643 A1* | 10/2003 | Joseph | G06Q 10/109 379/88.18 |
| 2010/0070457 A1* | 3/2010 | Kejariwal | G06N 5/003 706/59 |
| 2012/0196618 A1* | 8/2012 | Lowell | H04W 24/02 455/456.1 |
| 2017/0352041 A1 | 12/2017 | Ramamurthy et al. | |
| 2018/0197123 A1 | 7/2018 | Parimelazhagan et al. | |
| 2019/0126463 A1* | 5/2019 | Purushothaman | B25J 9/0084 |
| 2019/0138596 A1* | 5/2019 | Singh | G06Q 10/107 |
| 2019/0163594 A1* | 5/2019 | Hayden | G06N 20/00 |
| 2020/0019420 A1* | 1/2020 | Saimani | G06N 5/04 |

FOREIGN PATENT DOCUMENTS

EP 3206170 8/2017

* cited by examiner

*Primary Examiner* — Thomas C Lee
*Assistant Examiner* — Charles Cai
(74) *Attorney, Agent, or Firm* — Mannava & Kang, P.C.

(57) ABSTRACT

A robotic process automation (RPA) system provides solutions to issues generated during processing of entities in an application stack including a plurality of applications. The data regarding an issue is analyzed to categorize the issue as a new issue or an existing issue. For existing issues, solutions to resolve the issues are identified from a knowledge base. Even if the issue is categorized as a new issue, an identification of a solution from the knowledge base is initially attempted. If no solution can be identified, then the new issue is presented for user input and the solutions based on the user input are implemented for the resolution.

17 Claims, 9 Drawing Sheets

US 10,960,541 B2

ANALYTICAL ROBOTIC PROCESS AUTOMATION

PRIORITY

The present application claims priority under 35 U.S.C. 119(a)-(d) to the Indian Non-Provisional Patent Application Serial No. 201811046630, having a filing date of Dec. 10, 2018, the disclosure of which is hereby incorporated by reference in its entirety.

BACKGROUND

Robotic process automation (RPA) involves automation of processes using artificial intelligence (AI) and machine learning (ML) methodologies wherein certain tasks are carried out by bots which include processor-readable instructions. Generally high-volume, repeatable tasks are selected for RPA. These tasks can include queries, calculations, maintenance of records and transactions etc. RPA is non-intrusive in nature. RPA is generally not part of an organization's information technology (IT) infrastructure but is rather used on top of the existing platforms and hence no major changes are needed to implement RPA within existing IT infrastructure.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
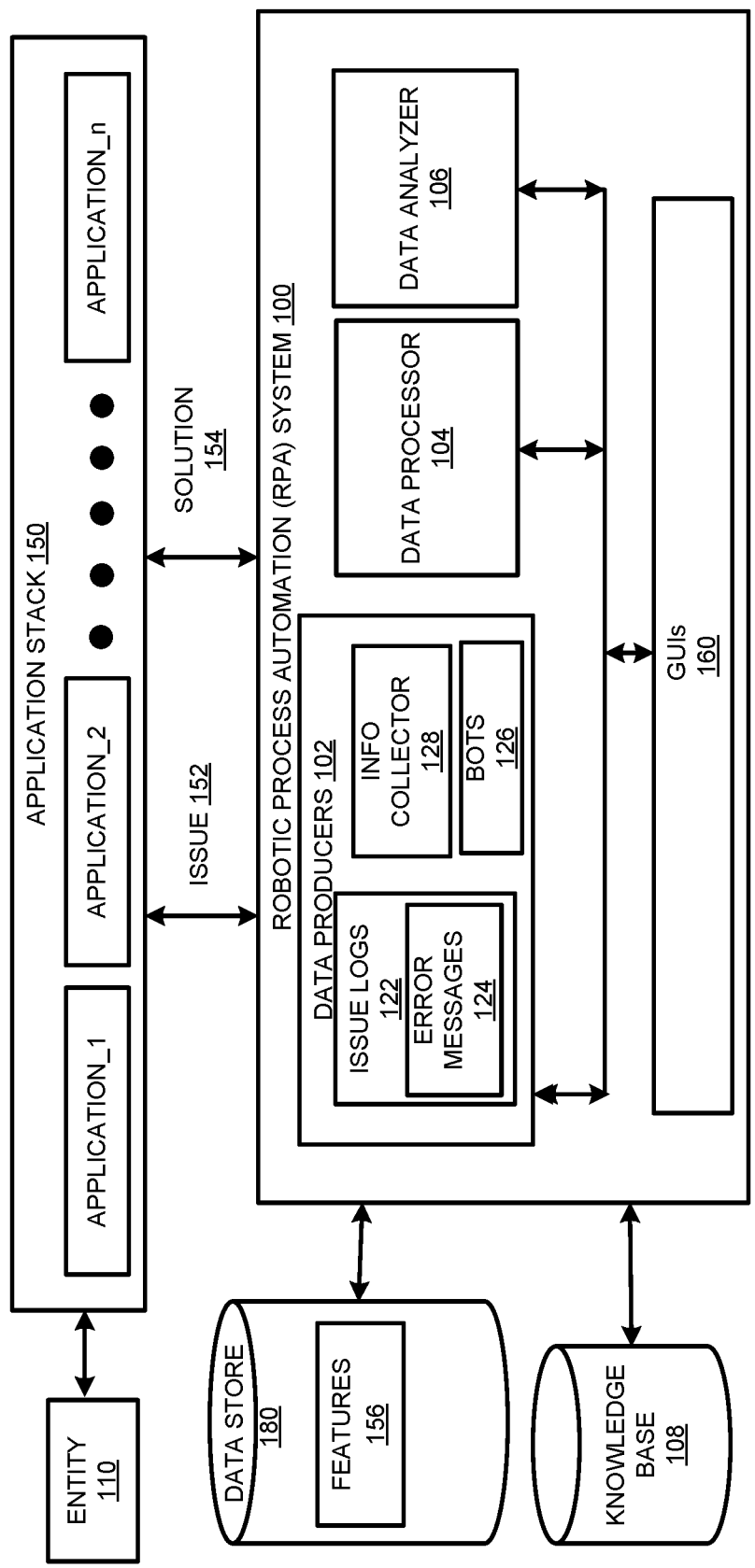
FIG. 1 is a block diagram that shows an analytical robotic process automation (RPA) system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An analytical robotic process automation (RPA) system receives data regarding the issues arising during the processing of an entity through an application stack and implements solutions to resolve the issues. The application stack includes a plurality of applications wherein each application in the application stack can be configured to execute one or more functions or tasks that affect the attributes of the entity. The applications can be configured such that the output from one of the applications can be accessed by other applications to enable the complete processing of the entity. The processing of the entity through the applications can give rise to failure points at one or more of the applications in the application stack which causes issues that prevent the smooth processing of the entity thereby preventing execution of a particular process associated with the entity. Accordingly, the applications associated with the failure points throw errors and the error messages which may be recorded in the application logs.

The RPA system can be communicatively coupled to the application stack so that the data regarding the issues including failures is received at the issue logs. In addition, the RPA system is coupled to a knowledge base which is a repository for the solutions that were previously implemented within the application stack for resolving the various issues that occurred during the prior processing of the entities. The issues from the application stack are processed as further detailed infra and checked for matches against the existing solutions. If no solution is found in the knowledge base, the issue is flagged for user input in order to generate a solution. Based on the success of the solution in resolving the issue, the solution is then updated to the knowledge base.

The error messages can be parsed and tokenized to extract the features associated with the issues. The features pertaining to an issue can include but are not limited to, the entity, the processing task to be executed for the entity by the application stack, the failure points of the task that caused the issue, the applications associated with the failure points, the errors associated with the failure points, the error messages which may include particular error codes etc. The issues to be addressed by the RPA system may vary in complexity. Some issues may be simple issues associated with simple errors having failures point at one of the applications in the application stack. Some issues may be complex issues with multiple errors from different applications in the application stack. The applications in the application stack can be based on different architectures, use different hardware/software platforms and the like. Accordingly, a variety of issues may be thrown by different applications with various error codes and the error messages may not be formatted throughout the application stack in a consistent manner. The data thus obtained from the application stack by the issue logs may include unstructured data.

The unstructured data from the issue logs is processed by a data processor via a parser and a tokenizer. The parsed, tokenized data is further processed by a noise remover to remove extraneous data such as gaps, stop words, punctuation etc. to convert the unstructured data into structured data. Hence, the different types of data generated by the different applications of the application stack can thus be uniformly formatted in a manner usable by the RPA system. The structured data thus obtained can include the various features of the issue such as but not limited to, the various attributes of the entity, the error codes, keywords from the error messages, the identifiers of the application(s) that caused the errors, the temporal parameters of the errors etc.

The features of the issue are employed to generate a unique key. The RPA system can be configured to use text matching techniques for identifying particular features of an issue for composing the unique key. The particular issue features used for generating the unique key can vary between the various domains in which the RPA system may be employed. Specific examples for generating the unique key are discussed herein below. The unique key is used in identifying solutions to resolve the issue from the knowledge base. A solution can involve processor-readable instructions for a series of actions, steps or tasks that are executed within the application stack to resolve the issue so that the failure point is removed and the processing of the entity proceeds smoothly. In an example, a solution can include a standard operating procedure (SOP) which are standardized procedures developed to resolve particular issues.

The unique key associated with the issue is used for identifying solution matches from the knowledge base. If one or more prior solutions that match the issue are identified from the knowledge base, the issue is classified as an existing issue. In an example, a decision tree methodology can be implemented to identifying solution matches from the knowledge base for issues from the application stack. When a matching solution is identified, the bots that automatically implement the solution are selected. The series of actions, steps or tasks associated with that particular solution are automatically executed within the application stack via the selected bots thereby enabling error-free processing of the entity through the application stack.

If no prior solution can be identified, the issue can be categorized as a new issue and a further methodology such as nearest neighbor can be employed to determine matches between the prior solutions in the knowledge base and the issue. If no prior solution is still found for the issue, the new issue is then presented to the user for user input. The user input can be received as one or more user gestures which are recorded for reproduction by the bots. Based on the selected solution, one or more bots can be further selected for execution of automatic actions. The automatic action functions using software are implemented to automate processes that are repetitive, rule-based and use structured data as input. The automatic action functions 'mimic' the actions a human user would perform in order to resolve the issue.

The RPA system described herein provides a technical solution to automate the resolution processes for issues arising with respect to entities being processed through an application stack which includes a plurality of applications configured for different functions and hosted on variety of hardware/software platforms. The RPA system detects fallouts/issues and resolves the issues using cognitive intelligence developed based on machine learning (ML) and natural language processing techniques (NLP). The historic data which is collected from the application logs is effectively used with a knowledge base that stores the solutions that were previously implemented to solve the issues. As hundreds or thousands of entities are processed via various automation systems which include multiple applications, innumerable errors of various types in different formats can occur. The RPA system disclosed herein provides the technical solution to reformulate the various errors or error messages from the different applications into a format usable by the RPA to automatically resolve the errors. As the application stack is updated with newer version of existing applications or even newer applications, the solutions can be updated accordingly by the users. A solution thus provided once by a user for resolving a particular issue is recorded by the RPA system to the knowledge base. The solution may not only be reused to solve the particular issue for which the solution was initially provided but may also be used for other issues that may subsequently occur. The recorded successes and failures of the solutions enable the RPA system to improve with time and usage.

FIG. 1 is a block diagram that shows an analytical robotic process automation (RPA) system 100 in accordance with the examples disclosed herein. The RPA system 100 includes data producers 102, a data processor 104 and a data analyzer 106. The RPA 100 is employed to identify issues or discrepancies arising in processing of an entity 110 through an application stack 150 which includes a plurality of applications application_1, application_2, . . . application_n. In an example, the entity may be an order for a cellular service that is processed through a stack of applications that pertain to order receipt e.g., an order decomposition application, order orchestration application, order provision application and order activation application, and applications for billing and other functions that are required to process the order for cellular service. By the way of illustration and not limitation, the order can pertain to one of the various types of available cellular services which can include signing up of a new customer, renewals, upgrades, reward claims etc. It may be appreciated that the applications application_1, application_2 . . . application_n in the application stack 150 may be disparate applications of diverse architectures using a variety of data formats/databases and sourced from different vendors. However, this diverse set of applications application_1, application_2 . . . application_n in the application stack 150 are configured to function together to process an entity 110.

Whenever a new customer signs up to receive cellular service, creation of a new record within the application stack 150 is required which includes recording the customer's identifying indicia as required by regulations, identifying the services the customer is eligible for, checking that the customer has paid or will pay for the service etc. On the other hand, a service renewal may require checking up the customer's credentials, ensuring that the service provisioned for is what the customer requested and paid for etc. The application stack 150 therefore manages the end-to-end activation of the SIM or the mobile number. Accordingly, the entity 110 is to be processed by one or more of the plurality of applications application_1, application_2 . . . application_n in the application stack 150. A typical application stack 150 may handle about 40-50 thousand requests within a day for various types for mobile services.

The data generated during the processing of an entity 110 through the application stack 150 can be recorded as unstructured data within the various application logs. If one or more issues are encountered in provisioning the order, then such issues may also be recorded in the application logs. In an example, the unstructured data indicative of the issues can also be logged to issue logs 122 included in the data producers 102 for further analysis and resolution. The data fallouts in the application stack with the detailed error messages are thus captured. In an example, the error messages 124 can be reformulated based on a predetermined syntax so that various error messages from the different applications in the application stack 150 are uniformly formatted. The RPA system 100 can connect to the application stack 150 via various modalities which can include but are not limited to, database (DB) link, user interfaces (UIs), via operating systems (OS) or via application programming interfaces (APIs) of one or more of the plurality of applications application_1, application_2 . . . application_n.

The issues logged can be simple issues pertaining to a single application in the application stack 150. More complex issues pertaining to multiple applications within the application stack 150 can also be logged in the issue logs 122. Various attributes of the issue 152 such as but not limited to, the name of the task(s) which failed, the time/date of failures, the applications associated with the failed tasks and the error messages associated with the failures etc. are also logged. Based on a received error message, the info collector 128 can be trained to seek further information from the application stack 150. For example, in response to detecting a particular error message, the info collector 128 may ping a particular application to seek the state information of that application.

Referring to the order entity, the issues can arise at various points during the order journey through the application stack 150. These can include order entity and validation, order decomposition, etc. and other applications. In order entry and validation, some common issues can include un-synched product information, contingency during order entity like product configuration and specification, manual error related to attributes like service address. During order decomposition, mismatch between order configuration and customer requirement can cause issues. Moreover, decomposed orders having new attributes not handled by a few of the applications in the application stack are some of the issues arising from order decomposition. Complex order plan comprising of fragile multitenant systems, new error codes encountered during processing of the entity and bulk order submission impact processing during order orchestration. During order provisioning, logical vs. physical order attribute mismatch, manual errors for order attributes, system and infrastructure constraints and interface issues can cause issues to be registered in the issue logs 122. Response timeouts, retry time exhaust and order fallout due to unforeseen modification cause issues during order activation. Billing and payment systems failures, data mismatch between customer relationship management (CRM) and billing system impacting bill to customer etc. are some examples of billing issues that may interrupt the processing of an order entity.

The data from the issue logs 122 is accessed by the data processor 104 for extracting the various features of the issue 152 logged therein. The issue features can include one or more attributes of the entity in addition to unique features of the issue 152 such as the error messages and content thereof. A data store 180 coupled to the RPA system 100 can be used to store information such as the unique identifiers assigned to the issues and the features 156 extracted from the issues etc. Referring to the example of an order entity, the entity attributes such as but not limited to, order_id, name of the customer, the type of service requested, date of request, billing status etc. can be accessed by the data processor 104 from the issue logs 122 in addition to the point(s) at which the order failed, the applications associated with the failure, the date/time of failure, the error messages corresponding to the failure etc. In some examples, the order attributes may be recovered by the data processor 104 from the application stack 150 as needed.

The data processor 104 cleans up the data from the issue logs 122 and extracts the issue features. For example, the issue features can be extracted from the reformulated error messages. As mentioned herein, error messages 124 indicative of the issue are accessed from the issue logs 122 and further processed by the data processor 104. The error messages 124 can include information such as fallout task names, error codes and one or more words, phrases or sentences indicating the type of errors that occurred. The data processor 104 may obtain the error codes and process the error messages via NLP for example, to select particular keywords indicative of the nature of the error. Furthermore, the data processor 104 may also identify which of the plurality of applications application_1, application_2 . . . application_n caused the error.

The information extracted by the data processor 104 is transmitted to the data analyzer 106 for further analysis and implementation of a solution to resolve the issue. The data analyzer 106 initially categorizes the issue into one of an existing issue or a new issue based on the received information. When the issue 152 is categorized as an existing issue, the data analyzer 106 identifies a solution 154 for implementation that can resolve the issue from a knowledge base 108. The knowledge base 108 is a repository of prior solutions that were previously implemented for resolving the various issues that arose in the application stack 150. The solution 154 can be identified from the prior solutions via matching the features 156 of the issue 152 with features of the solution 154 which may be stored in the knowledge base 108. For example, specific error codes, error messages or selected keywords, particular applications and metadata of the applications indicative of the application state etc. can be part of the features 156 associated with the issues and the corresponding prior solutions that were implemented to resolve the issues. The features of the issue are scored for matches against the solutions in the knowledge base 108 and the solution 154 is selected based on a comparison of the scores of the different solutions in the knowledge base 108.

The solution 154 may be implemented by one or more trained bots 126 which are configured to automatically execute actions for correcting or compensating for the errors or deficiencies in the entity processing that caused the application stack 150 to raise the issue. In an example, the data producer 102 can maintain a mapping between particular known or existing issues and the corresponding bots that implement the actions which resolve the issues. The actions can be implemented in one or more applications. The results obtained from executing the actions in the application(s) are collected and examined. If the action(s) caused the issue to be resolved so that the entity is able to pass through the application stack 150 without further errors, the action(s) can be registered as successful actions within a knowledge base 108 which stores data for further training the RPA system 100 in providing solutions to issues raised by the application stack 150.

In case the implemented actions are not successful in solving the issue 152, the issue 152 may be flagged for human review. In an example, a human user can review the issue 152 via one of the GUIs 160 associated with the RPA system 100 and provide a solution 154 which is further recorded as training data for the issue 152. Thus, explicit user actions in addressing the issue 152 can be recorded within the knowledge base 108. The explicit user actions can be used to generate and train the bots 126 which can implement the solution provided by the user via automatically executing the recorded user actions the next time the same issue 152 arises. The RPA system 100 is therefore configured for implicit and explicit training.

If the issue 152 is categorized as a new issue, the data analyzer 106 can employ further analysis of the solutions in the knowledge base 108 for identifying if one of the prior solutions can resolve the new issue. If no prior solution can be identified, then the new issue can be flagged for human review as described above. The solution input from the user is used to generate and train the bots that can implement one or more solutions to resolve the new issue. The RPA system 100 therefore enables smooth processing of entities to meet different requirements by automatically identifying issues in the processing of the entities and implementing solutions to resolve the issues. In an example, the RPA system 100 can include a reporting tool that provides performance metrics periodically or on demand.

The RPA system 100 as described herein provides for an open source based, highly customizable solution which is supported with reporting. By the way of illustration and not limitation, Jenkins based job automation provides a scalable toolset for managing the solution bots/scripts. The solutions can include Python-based solution scripts which are well-standardized for parameters, responses and logging mechanism. Kibana-based reporting tool leverages the standardized logging for real-time metrics. Custom machine learning (ML) based methodologies are used to identify the correct solutions for a given issue and update the knowledge base 108 in accordance with the examples disclosed herein.

Figure 2:
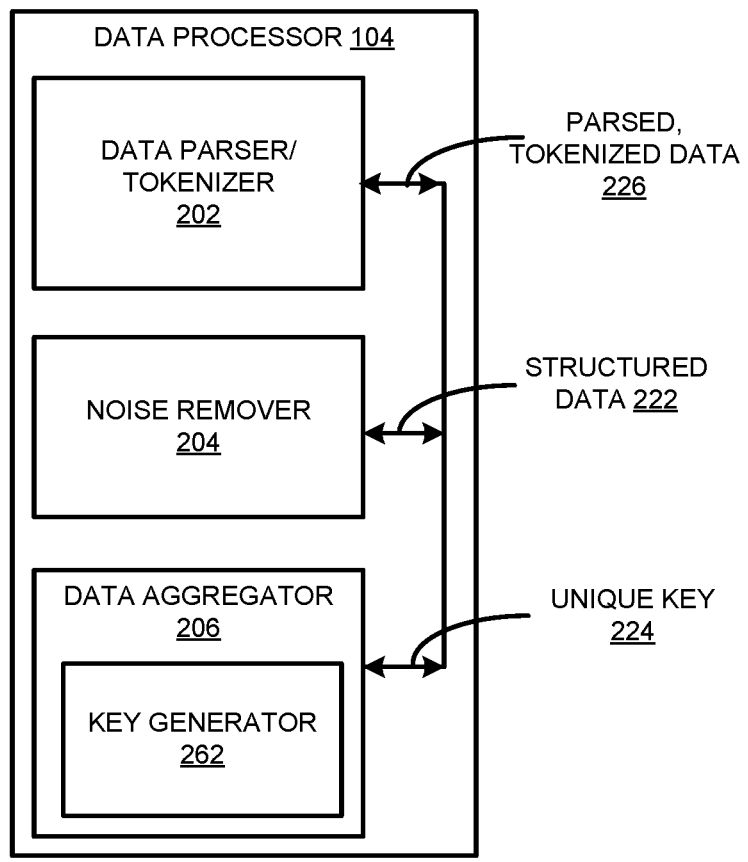
FIG. 2 shows a block diagram of a data processor in accordance with the examples disclosed herein.

FIG. 2 shows a block diagram of the data processor 104 in accordance with the examples disclosed herein. The data processor 104 includes a data parser/tokenizer 202, a noise remover 204 and a data aggregator 206. The data processor 104 accesses the information regarding the issue 152 from the issue logs 122. The unstructured data from the issue logs 122 including the various error messages 124 need to be processed in order to enable accurate identification of the issue 152 and correspondingly the solution 154. As mentioned earlier, the plurality of applications application_1, application_2, . . . application_n in the application stack 150 may be associated with different vendors and serve different purposes. Accordingly, the issues that arise with the plurality of applications application_1, application_2, . . . application_n in the application stack 150, the types of errors that each of the plurality of applications emits, the error codes, the formats for the error messages etc. can be very different. Referring back to the cellular services order example, the errors emitted by a billing application can be very different from the errors emitted by a service provisioning application. Accordingly, the data processor 104 is configured to process the information obtained by the data parser/tokenizer 202 for transforming it into a consistent format usable by the RPA system 100.

A data parser/tokenizer 202 is included in the data processor 104 for parsing the unstructured data from the issues log 122. The data parser/tokenizer 202 can be further configured to generate tokens from parsing the data. The parsed, tokenized data 226 is next processed by the noise remover 204 which can be configured to clean the data by removing noise such as but not limited to special characters, stop words, punctuation, etc. Structured data 222 including the necessary information from the issue logs 122 such as error codes, selected keywords, application identifiers indicating the failure points etc. is obtained from the noise remover 204.

The structured data 222 is then clustered by the data aggregator 206 to generate a unique key 224. The unique key 224 is automatically generated for each issue that is obtained from the application stack 150 by the RPA system 100. The data aggregator 206 therefore includes a key generator 262 which generates the unique key 224 from the various features 156 associated with the issue 152. In the example, wherein the issue 152 pertains to the order for cellular services, the unique key 224 can be generated using features such as but not limited to, the type of order, the kind of task the order is failing at, the kind of error message, the terms of keywords of the error message(s) etc. By the way of illustration and not limitation, below is an example of the generation of the unique key from the features 156.

| Order_Num | Task Name | Order type | OSM_ERROR_MESSAGE | SOA_ERROR_DETAIL |
|---|---|---|---|---|
| 1-34192951852900 | Initiate Billing SubProcess | Resume Hybrid 2Hybrid | Line failed. lt::orderfalloutdata:ErrorMessage xmlns:aiacommsdate=quot::http://www.oracle.com/XSL/Transform/java/oracle.apps.aia.industry.comms.util.AIAGetDateOffsetquot:: Exception occured when binding was invoked. Exception occured during invocation of JCA binding:quot::JCA | Exception occured when binding was invoked. 'PCM_OP_CUST_SET_STATUS' failed ErrMsg=ERR_BAD_READ ErrStr=ERR_BAD_READ |

From the error information above, various features and corresponding values are used for generating the unique key 224. Order type—"ResumeH2H", Fallout Task Name "InitiateBillingSubProcess", OSM_Error_Message "ERR_BAD_READ", so that the unique key generated from the fields can read as "RESUMEH2H_InitiateBillingSubProcess_invocation of JCA binding_ERR_BAD_READ". The unique key 224 thus generated enables identifying the accurate solution for resolving the error.

Figure 3:
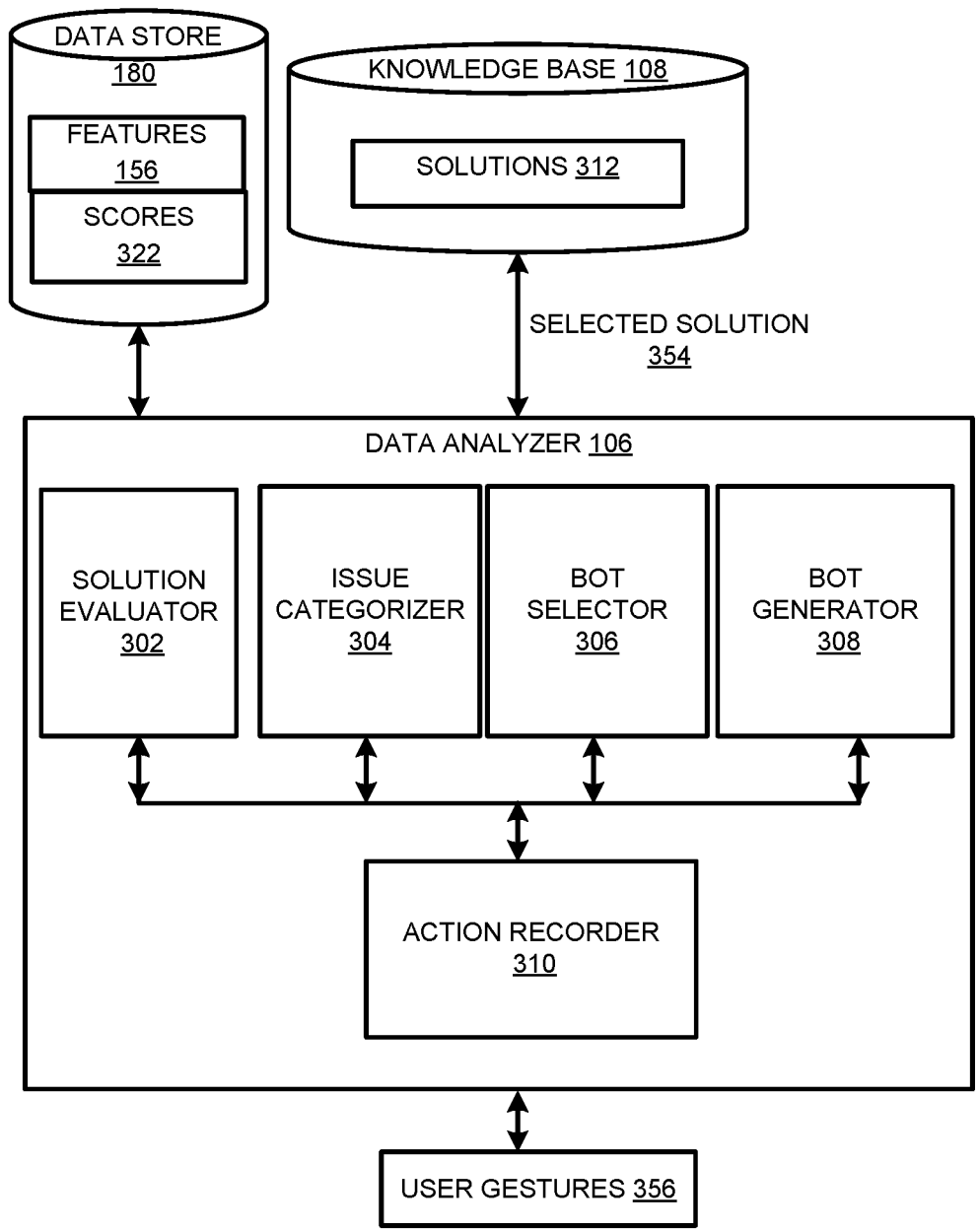
FIG. 3 shows a block diagram of a data analyzer in accordance with the examples disclosed herein.

FIG. 3 shows a block diagram of the data analyzer 106 in accordance with the examples disclosed herein. The data analyzer 106 includes a solution evaluator 302, an issue categorizer 304, a bot selector 306 and a bot generator 308. The solution evaluator 302 receives the information regarding the issue 152 that is extracted by the data processor 104. The data analyzer 106 therefore receives the features extracted from the issue logs 122 including the unique key 224. Based on the unique key 224, the solution evaluator 302 evaluates the various solutions 312 recorded in the knowledge base 108 that were previously implemented for resolving various issues that were thrown by the application stack 150. By the way of illustration and not limitation, the solution evaluator 302 can implement a decision tree methodology for generating scores 322 for the solutions 312 based on matches between the features of the issue 152 and the features of each of the solutions.

The scores 322 are used by the issue categorizer 304 to categorize the issue 152 as one of a new issue or an existing issue. The categorization occurs based on the existence of one or more solutions in the knowledge base 108 for resolving the issue 152. In an example, the issue categorizer 304 can include classifiers that are trained to select particular solutions for the issue 152 based on the scores 322. In case one or more of the solutions 312 are selected by the issue categorizer 304 for resolving the issue 152, then the issue 152 can be categorized as an existing issue. If none of the solutions 312 are selected by the issue categorizer 304, then the issue 152 can be categorized as a new issue for which the solution is to be obtained.

When the issue 152 is categorized as an existing issue, the data regarding the issue 152 e.g., the application at which the data fallout occurred, the type of error that occurred and the solution 354 which was selected from the prior solutions 312 for resolving the issue 152 is transmitted to the bot selector 306. The bot selector 306 can identify and select one or more of the bots 126 for implementing the selected solution 354 at one or more of the applications application_1, application_2 . . . application_n in the application stack 150. As mentioned earlier, the bots 126 include processor-executable instructions for executing one or more actions that enable correcting the errors that caused the issue 152 to be raised.

By the way of illustration and not limitation, the selected solution 354 may cause certain script-based actions for connecting to the one or more applications and provide some updates for resolving the issue 152 and enable complete processing of the entity 110. Similarly, the selected bots can implement a web-based solution such as making updates via user interfaces (UIs). Other solutions implemented by the bots 126 can be application programming interface (API) based solutions or Windows® based solutions so that if the application provides APIs for executing certain actions, then the selected bots may interact with the application via such APIs to execute the actions for resolving the issue 152. Similar to the issues described above, the solutions 312 may have various levels of complexity associated therewith. Certain simple issues may be resolved via implementation of simple rule-based solutions. Other issues may have greater complexities and may require selection of bots for interacting with multiple applications in the application stack 150 in different ways. Accordingly, the selected solution 354 may involve one or more of the script-based, UI-based or API-based interactions with the applications in the application stack 150. In addition, the order in which the actions are to be executed within each of the multiple applications is to be determined if the selected solution 354 involves multiple interactions with the multiple applications. As the issue 152 is categorized as a known issue or an existing issue which was previously resolved by the selected solution 354, the multiple interactions with the multiple applications can therefore by determined by the selected solution 354. The selected solution 354 is implemented and the results generated may be recorded by the action recorder 310 to the knowledge base 108. Thus, if the selected solution 354 resolves the issue 152, then such recordation serves as implicit training for the RPA system 100 in solving the issue 152.

When the issue 152 is categorized as a new issue upon the implementation of the decision tree methodology for the score evaluation, the bot selector 306 may execute a further check on the solutions 312 using a matching methodology such as the nearest neighbor. Referring to the order for cellular service example, several fields such as but not limited to order type, task name, MSISDN, ICCID, service type etc. may be checked via the nearest neighbor methodology with the prior solutions 312. The confidence levels associated with the prior solutions 312 may be evaluated to determine if any solutions can be selected to resolve the issue 152. If none of the prior solutions 312 are selected, then the issue 152 is flagged for user review. The user may provide feedback with the correct solution for the new issue via for example, the GUIs 160. In an example, the user gestures 356 to fix the issue 152 can be recorded as a new solution within the knowledge base 108 and the bots for implementing the correct solution may be trained on the user gestures 356 by the bot generator 308.

Figure 4:
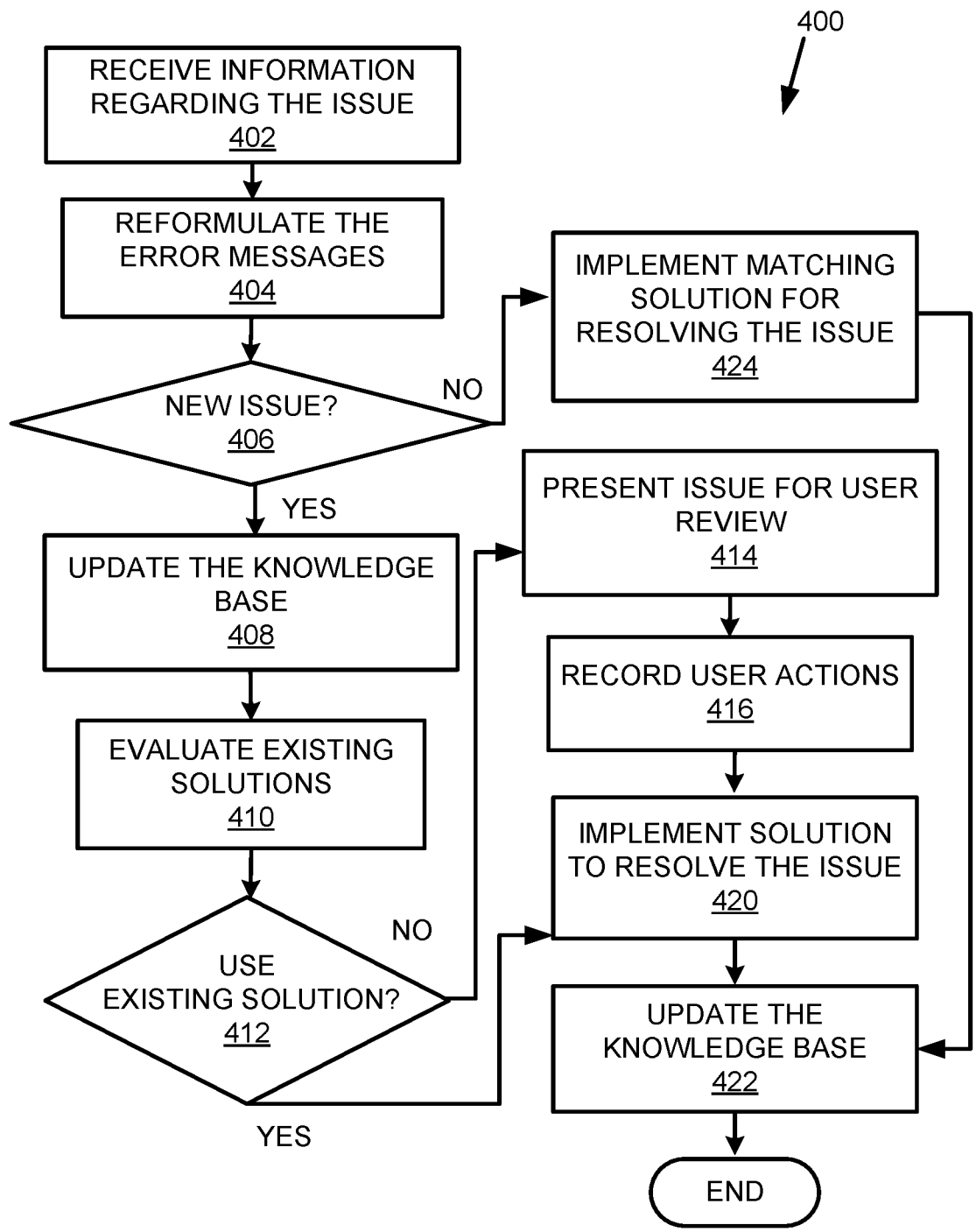
FIG. 4 shows a flowchart that details a method of implementing a robotic process automation in accordance with the examples disclosed herein.

FIG. 4 shows a flowchart 400 that details a method of implementing a robotic process automation in accordance with the examples disclosed herein. The method begins at 402 wherein the information regarding the issue 152 that arose during the processing of the entity 110 within the application stack 150 is received at the RPA system 100. For example, if the entity 110 pertains to an order for cellular services, issues such as 'ICCID not existing' message may be received. There can be multiple reasons for the application stack 150 to fire such a message. It can be because it is assigned to another mobile service user or it is not in a state to be assigned etc. Accordingly, the information received at 402 can include the order ID, the order type, the task name, the error messages thrown up by the application stack, the temporal info related to the error messages etc. are received at the issue logs 122. In an example, based on an error message, the RPA system 100 may query a particular application for additional information.

As mentioned herein the plurality of applications—application_1, application_2, . . . application_n may be different types of applications with a variety of architectures. For example, some applications can be standalone applications installed on a computer executing the application stack 150. Some of the applications may implement a client-server architecture wherein the client installed on the computer executing the application stack 150 periodically communicates with a remote server. Other applications can implement a cloud architecture wherein the entire application is hosted on a remote cloud server which the machine implementing the application stack 150 maintains a communication link with the remote cloud server. Moreover, different applications in the application stack 150 are configured to execute different tasks during the processing of the entity 110 through the application stack 150. Therefore, the error messages produced by the different applications may relate to different types of errors and may be formatted differently. Therefore, the error messages may be reformulated at 404 if needed to be stored into a common format. In an example, the common format can include a error code. Even for instances where all the error messages are from a single application of the plurality of applications, the error messages may still be reformulated into a format usable by the RPA system 100 at 404.

At 406, it is determined if the issue 152 is one of an existing issue or a new issue based on the identification of a solution from the knowledge base 108 for resolving the issue. If it is determined at 406 that the issue 152 is not a new issue, then the identified solution and the actions associated therewith are automatically selected and implemented at 424, the knowledge base 108 is updated accordingly at 422 and the method terminates on the end block. If it is determined at 406 that the issue 152 is not a new issue, then the knowledge base 108 may be updated with the new issue at 408. In an example, a "New fallout table" may be updated. The existing solutions are evaluated at 408 for matching with the issue 152. In an example, a nearest neighbor methodology can be adapted for evaluating the existing solutions wherein various features of the issue 152 are checked for match against the existing solutions. At 410, the scores of the existing solutions may be compared to determine if one or more of the existing solutions indicate a match with the issue. If it is determined at 410, that the one or more solutions indicate a match, then such solutions are selected at 412 for implementation to resolve the issue 152. If it is determined at 412 that no solutions exist for implementing to resolve the issue 152, then the issue is presented to the user for review at 414. The user actions to resolve the issue are recorded at 416 and a solution associated with the recorded user actions is implemented within the application stack 150 at 420 to resolve the issue 152. The recorded user actions and the results of the recorded user actions which can include the success or failure of the recorded user actions in resolving the issue may be updated to the knowledge base 108 at 422. If the recorded user actions result in resolving the issue 152 thereby ensuring a smooth, error-free processing of the entity 110 through the application stack 150, the user actions may be added to the existing solutions and made available for implementation when an issue arises during the processing of an entity through the application stack 150. In the example wherein the entity 110 pertains to the order for cellular services, an order having a unique key and an associated solution can be added to a table "Fallout_Order_solution_BOT" which maps the issue against the solution for all the orders. In an example, negative true and negative false values may also be employed for checking the accuracy of the algorithmic methodologies used herein.

Figure 5:
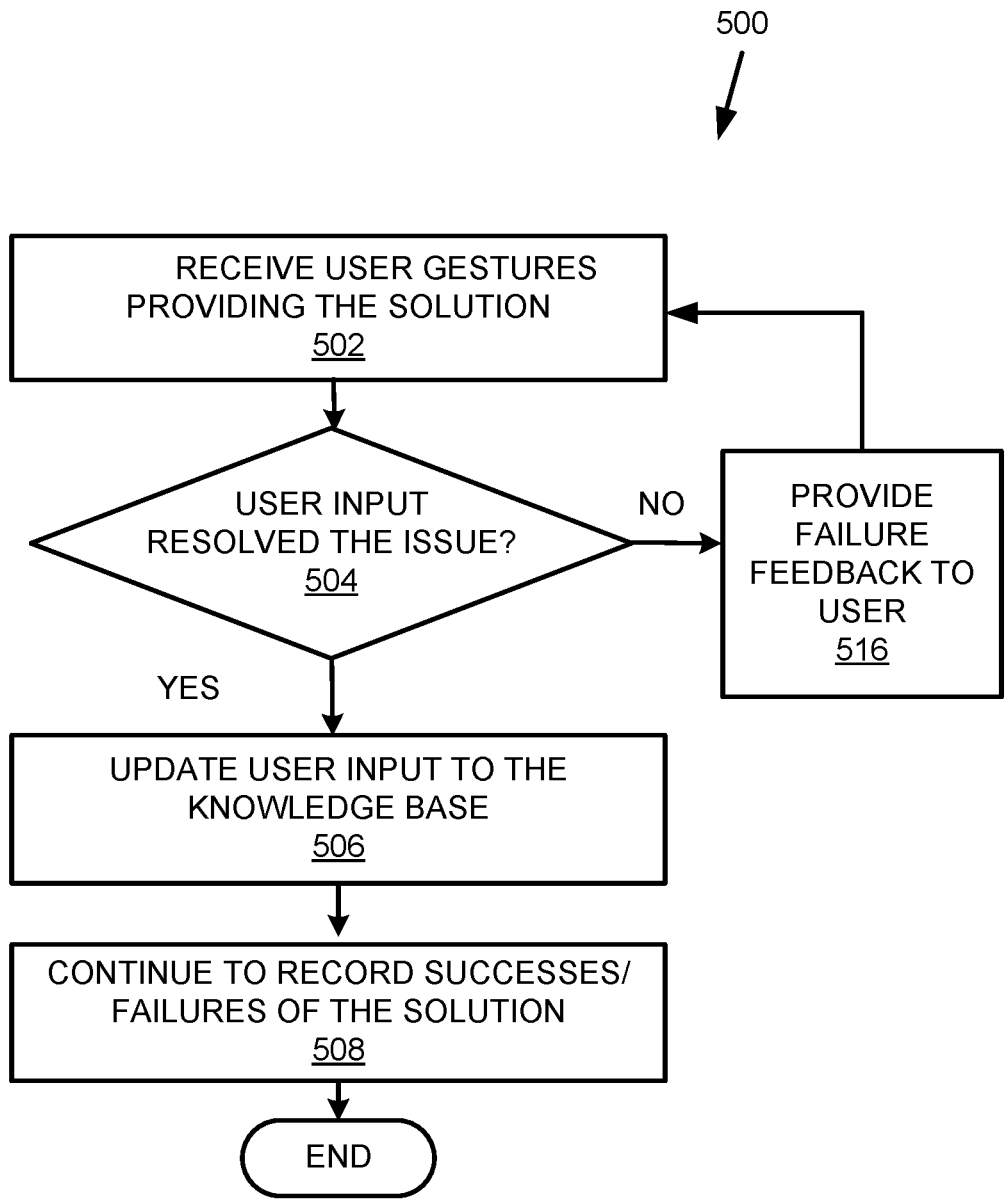
FIG. 5 shows a flowchart of a method of implementing a solution provided by a user for resolving an issue in accordance with the examples disclosed herein.

FIG. 5 shows a flowchart 500 of a method of implementing a solution provided by a user for resolving the issue 152 within the application stack 150 in accordance with the examples disclosed herein. The method begins at 502 wherein the user gestures 356 providing a solution are received for recordation. The user gestures can include selection of particular tools such as APIs or UIs or database connections for communicating with the failure points. Therefore, recordation of the user gestures 356 can also include the exact application/tool that was invoked by the user and the input provided by the user via the application/tool and the order in which the input was provided. At 504 it is determined if the user input was able to resolve the issue 152. If it is determined at 504 that the user input was able to resolve the issue 152, then the user gestures and the user input is updated to the knowledge base 108 at 506 along with a mapping to the issue 152 as a solution for resolving the issue. At 508, the RPA system 100 continues to record the subsequent successes/failures of the solution in resolving the issue 152 and other issues that may arise. If it is determined at 504 that the user input was not able to resolve the issue 152, the feedback to this end is provided to the user at 510 and the RPA system 100 returns to 502 for receiving further user gestures with a solution for resolving the issue 152.

Figure 6:
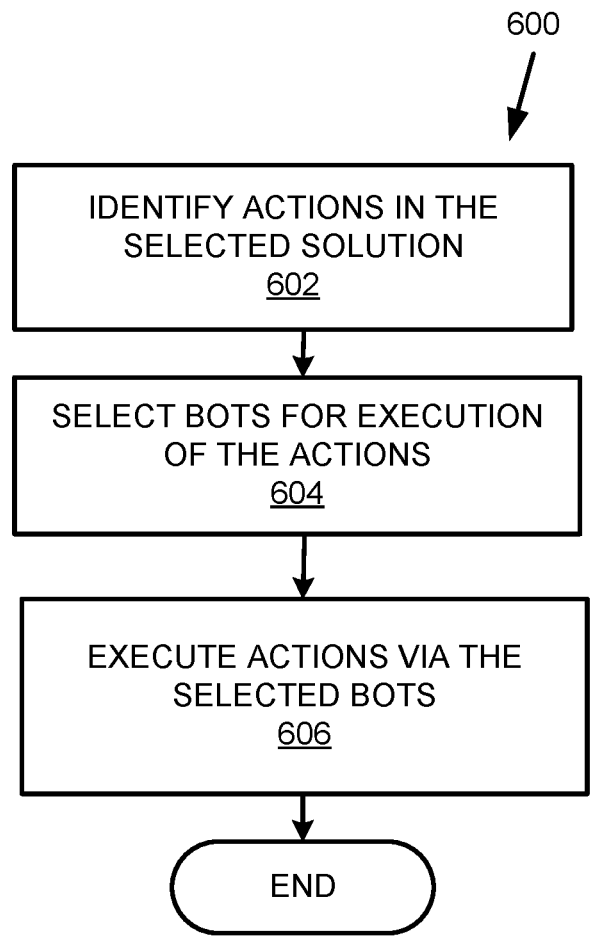
FIG. 6 shows a flowchart that details a method of automatically implementing the selected solution in accordance with the examples disclosed herein.

FIG. 6 shows a flowchart 600 that details a method of automatically implementing the selected solution 354 in accordance with the examples disclosed herein. The actions or steps included in the selected solution are identified at 602. The selected solution 354 may be a simple rule-based solution or the selected solution 354 may be complex solution including a number of actions to be executed via a number of applications from the application stack 150. At 604, a subset of the bots 126 that are trained to execute the automatic actions with the corresponding applications are selected. The automatic actions are executed at 606 by employing the selected bots.

Figure 7:
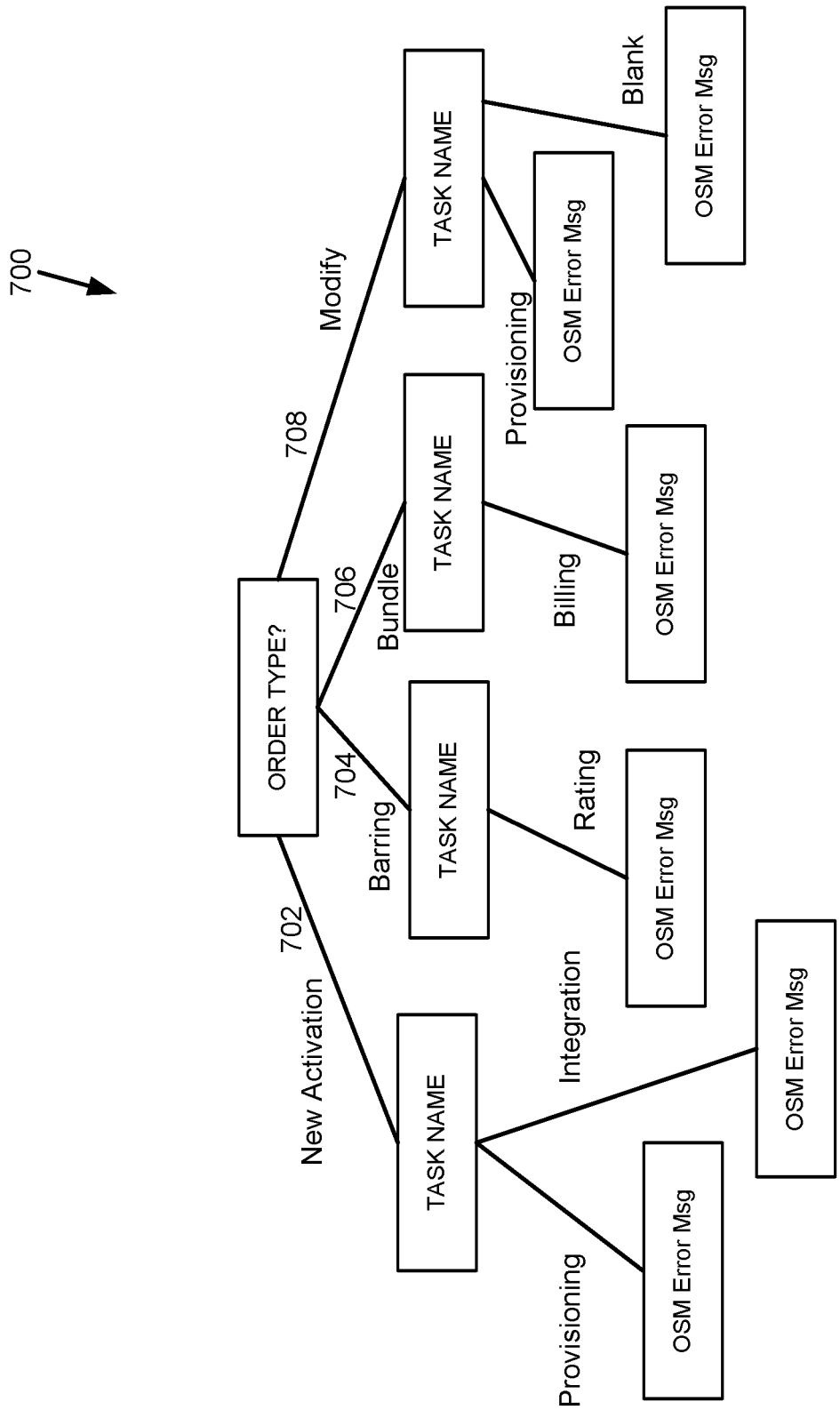
FIG. 7 shows a tree structure representative of the implementation of a decision tree methodology.

FIG. 7 shows a tree structure 700 representative of the implementation of a decision tree methodology in identifying a solution for an issue occurring during the processing of the order for cellular services in accordance with the examples disclosed herein. It may be appreciated that the examples are discussed herein with respect to the order for cellular services solely for illustration purposes and that the identification of issues and automatic solution implementation discussed herein can be similarly applied to other entities which are processed through an application stack in other domains in accordance with the examples disclosed herein.

As mentioned earlier, a unique key is generated for the order as "RESUMEH2H_InitiateBillingSubProcess_invocation of JCA binding_ERR_BAD_READ". In order to identify a solution accurately based on the unique key value, a decision tree methodology may be implemented. Features for identifying the correct solution may include but are not limited to Fallout Order Type, Fallout Order Task Name, Fallout OSM Error Message, Fallout OSB Error Message, Fallout SOA Error Message and Fallout SASi Error Message.

The decision tree methodology enables identifying the correct solution for the issue arising on a particular 'ORDER TYPE' via traversing the tree paths or branches of the tree structure 700. Each of the branches 702, 704, 706 or 708 may be traversed based on whether the order type is New Activation, Barring, Bundle or Modify. The various order types have different tasks associated therewith in order to complete the order. Accordingly, New Activation order may require execution of the Provisioning and Integration tasks while Barring may require execution of the Rating task, Bundle requires execution of Billing task and Modify orders may require Provisioning and Blank tasks. Each feature of the solution may be associated with a respective score based on a match between the solution feature and the issue features. Based on the respective overall scores of various branches for the various features associated with the leaves of the branch, a particular branch of the tree structure 700 having a highest score may be selected as the correct solution. The overall respective scores of the tree paths can be compared with a predetermined score threshold for the selection of the particular branch. Each order having a unique key and an associated solution may be added to a table "Fallout_OrderSolution_BOT" which maps each issue against a solution taken to address the issue for all the orders.

Figure 8:
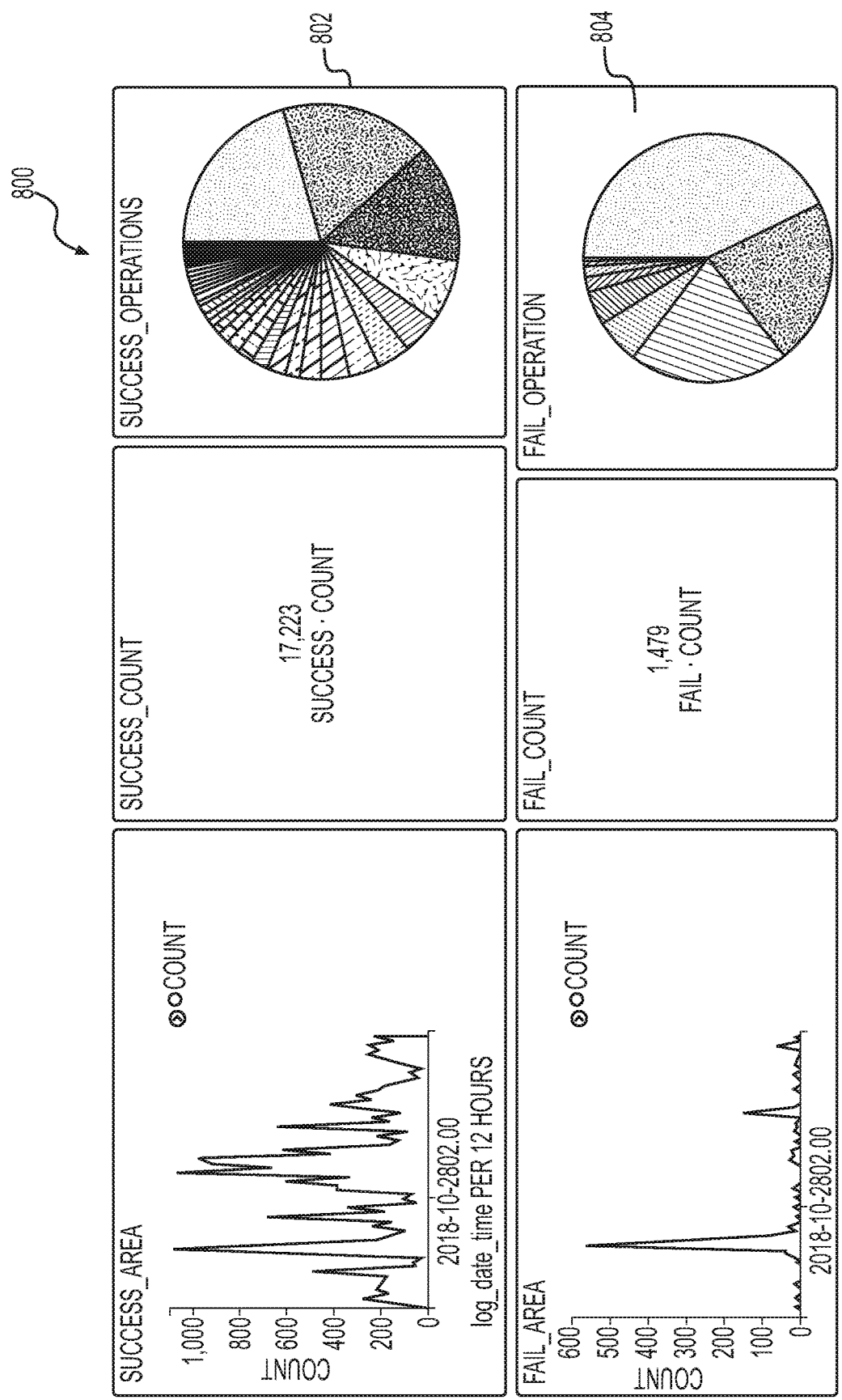
FIG. 8 shows an example dashboard generated in accordance with the examples disclosed herein.

FIG. 8 shows an example dashboard 800 generated for displaying the various statistics and metrics associated with the RPA system in accordance with the examples disclosed herein. The dashboard 800 shows the actions taken by the RPA system 100 for performing fallout remediation with success and failure results. The upper portion 802 of the dashboard 800 shows the success statistics including the success count, success operations etc. while the lower portion 804 of the dashboard shows failure statistics. The dashboard 800 can be configured using Elastic® search to give quick response for various search criteria. In addition to particular task, error and application names, the search criteria can also include time parameters like Year, Months, Days and times (hour, minutes, seconds) etc.

In addition, the RPA system 100 can be configured for various reporting functions which can include entity fallout analysis, entity remediation identification and the automatic actions that were implemented. The dashboard 800 provides a quick summary for all entities including old/new issues resolved, successful and unsuccessful action taken etc. The order fallout analysis report can include error description and the entity details e.g, order details in case the entity is the order for cellular services. The order remediation identification report can include matching solutions that were selected based on the error details while the automatic action report may highlight the actions that were taken by each of the bots 126 in real-time.

Figure 9:
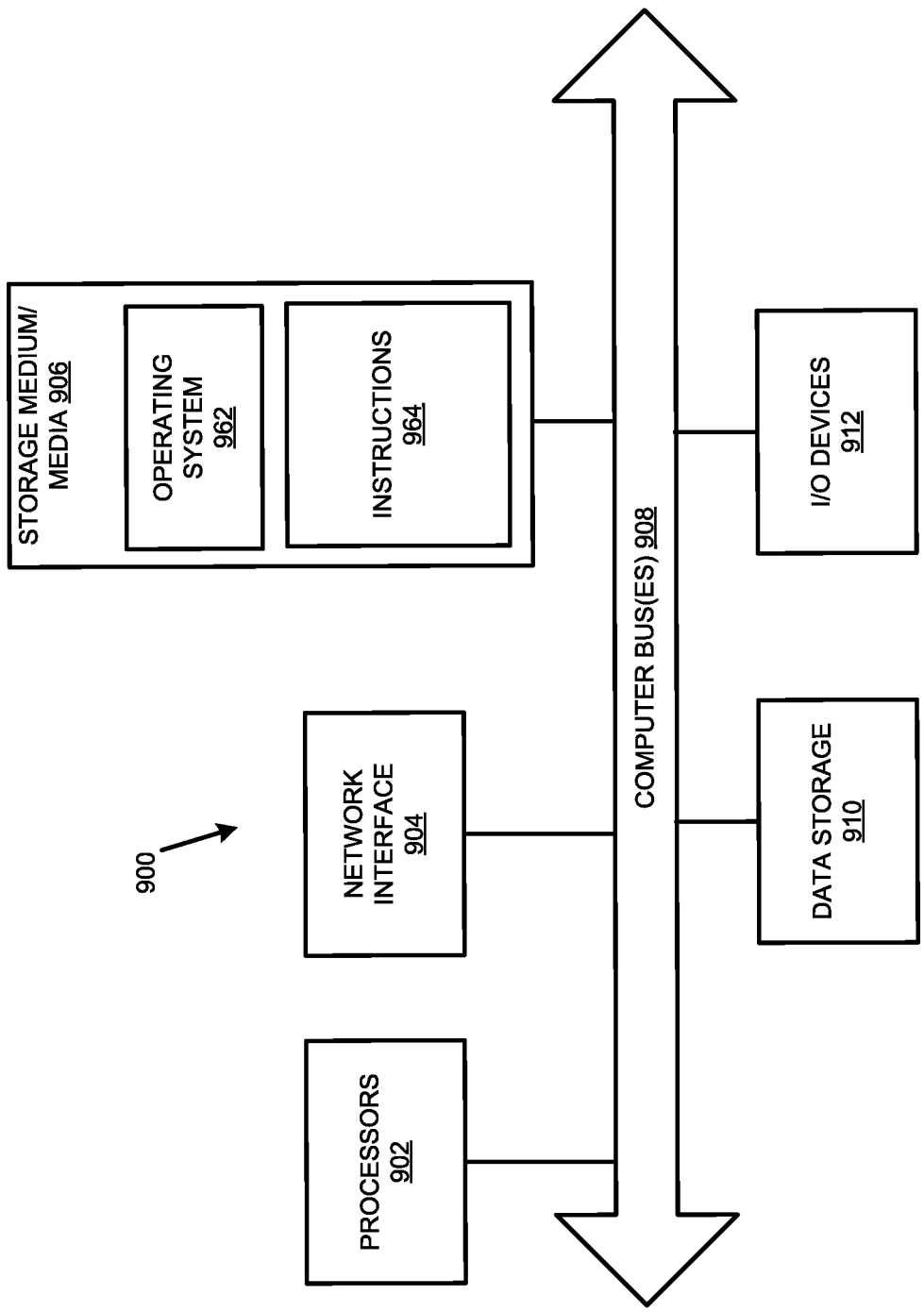
FIG. 9 illustrates a computer system that may be used to implement the automated search system in accordance with examples disclosed herein.

FIG. 9 illustrates a computer system 900 that may be used to implement the RPA system 100. More particularly, computing machines such as desktops, laptops, smartphones, tablets and wearables which may be used to generate or access the data from the RPA system 100 may have the structure of the computer system 900. The computer system 900 may include additional components not shown and that some of the components described may be removed and/or modified. In another example, a computer system 900 can sit on external-cloud platforms such as, Amazon Web Services, AZURE cloud or internal corporate cloud computing clusters, or organizational computing resources, etc.

The computer system 900 includes processor(s) 902, such as a central processing unit, ASIC or other type of processing circuit, input/output devices 912, such as a display, mouse keyboard, etc., a network interface 904, such as a Local Area Network (LAN), a wireless 802.11x LAN, a 3G or 4G mobile WAN or a WiMax WAN, and a non-transitory processor-readable medium or a computer readable medium 906. Each of these components may be operatively coupled to a bus 908. The computer-readable medium 906 may be any suitable medium which participates in providing instructions to the processor(s) 902 for execution. For example, the computer-readable medium 906 may be non-transitory or non-volatile medium, such as a magnetic disk or solid-state non-volatile memory or volatile medium such as RAM. The instructions or modules stored on the computer-readable medium 906 may include machine-readable instructions 964 executed by the processor(s) 902 to perform the methods and functions of the RPA system 100.

The RPA system 100 may be implemented as software stored on a non-transitory computer-readable medium and executed by the one or more processors 902. For example, the computer-readable medium 906 may store an operating system 962, such as MAC OS, MS WINDOWS, UNIX, or LINUX, and code 964 for the RPA system 100. The operating system 962 may be multi-user, multiprocessing, multitasking, multithreading, real-time and the like. For example, during runtime, the operating system 962 is running and the code for the RPA 100 is executed by the processor(s) 902.

The computer system 900 may include a data storage 910, which may include non-volatile data storage. The data storage 910 stores any data used by the RPA system 100. The data storage 910 may be used to store the entity information, entity features that were extracted, the solutions and the scores for the solutions during the issue-score matching process and the like.

The network interface 904 connects the computer system 900 to internal systems for example, via a LAN. Also, the network interface 904 may connect the computer system 900 to the Internet. For example, the computer system 900 may connect to web browsers and other external applications and systems via the network interface 904.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An analytical robotic process automation system comprising:
   at least one processor;
   a non-transitory processor readable medium storing machine-readable instructions that cause the at least one processor to:
   receive data regarding an issue arising during processing of an entity through an application stack that includes a plurality of applications wherein each of the plurality of applications affects at least one attribute of the entity and at least a subset of the plurality of applications emit error messages of different formats as unstructured data, wherein the entity pertains to an order for provisioning a cellular service plan and the plurality of applications include an order entry and validation application, an order decomposition application, an order orchestration application, an order provisioning application, an order activation application and an order completion application;
   reformulate the error messages emitted by at least the subset of the plurality of applications in the different formats into a common format as structured data;
   extract one or more features of the issue from the structured data, wherein the one or more features include features extracted from at least one error message pertaining to the issue;
   automatically generate a unique key for the issue based on the features of the issue;
   categorize the issue as one of an existing issue or a new issue based on identification of one or more solutions within a knowledge base for resolving the issue wherein the knowledge base includes a plurality of solutions, wherein the solutions from the knowledge base are identified using the unique key;
   if the issue is categorized as an existing issue, then:
      determine respective scores for the one or more solutions in the knowledge base;
      select one of the one or more solutions based on a comparison of the scores;
      select one or more trained bots for execution of automatic actions corresponding to the selected one of the one or more solutions;
   if the issue is categorized as a new issue, then:
      present the new issue for solution input from a user;
      create one or more trained bots for execution of automatic actions associated with the solution based on the input from the user;
   and
   execute automatic actions associated with the solution via the trained bots, wherein the automatic actions resolve the issue.

2. The analytical robotic process automation system of claim 1, wherein instructions for executing the automatic actions cause the processor to:
   mimic actions performed by a human user for resolving the issue.

3. The analytical robotic process automation system of claim 1, wherein the instructions for receiving the data regarding the issue comprises further instructions that cause the processor to:
   access logs of the plurality of applications in the application stack and details of the trained bots that execute automatic actions for resolving issues including the issue in the application stack.

4. The analytical robotic process automation system of claim 3, wherein the non-transitory medium further comprises instructions that cause the processor to:
   capture data fallouts with detailed error messages from the plurality of applications in the application stack.

5. The analytical robotic process automation system of claim 1, wherein the instructions to categorize the issue as one of a new issue or an existing issue comprises further instructions that cause the processor to:
   implement a decision tree machine learning (ML) using the unique key;
   traverse tree paths associated with the plurality of solutions wherein, within each of the tree paths, each feature associated with the issue has a corresponding score; and
   determine the respective scores for the solutions by obtaining a respective score for each of the tree paths for the issue by aggregating the corresponding scores of the features.

6. The analytical robotic process automation system of claim 5, wherein the instructions for categorizing the issue as one of the new issue or the existing issue comprises further instructions that cause the processor to:
   compare the respective scores with a predetermined score threshold; and
   categorize the issue as an existing issue if at least one of the tree paths has a score greater than the predetermined score threshold.

7. The analytical robotic process automation system of claim 6, wherein the instructions for selecting one or more of the solutions for the existing issue comprises further instructions that cause the processor to:
   select a subset of the tree paths having the respective scores higher than the predetermined score threshold; and
   select one of the tree paths from the subset of tree paths having a highest score as the solution for the execution of the automatic actions.

8. The analytical robotic process automation system of claim 1, wherein if the issue is categorized as a new issue the non-transitory processor readable medium further comprises instructions that cause the processor to:
   determine, via a nearest neighbor process, a corresponding confidence level for each of the solutions based on the features; and
   select one of the solutions for resolving the issue based on the corresponding confidence level of the selected solution.

9. The analytical robotic process automation system of claim 1, wherein the features extracted from the error message include at least a fallout task name and selected keywords.

10. A processor-executable method for implementing a robotic process automation comprising:
    collecting in a knowledge base, data pertaining to provisioning of orders for cellular service plans;
    receiving data regarding an issue impeding provisioning of an order for a cellular service plan through an application stack that includes a plurality of applications employed for the provisioning of the order wherein at least a subset of the plurality of applications emit error messages of different formats as unstructured data, wherein the plurality of applications include an order entry and validation application, an order decomposition application, order an orchestration application, an order provisioning application, an order activation application and an order completion application;
    reformulating the error messages emitted by at least the subset of the plurality of applications in the different formats into a common format as structured data;
    extracting one or more features of the issue, wherein the one or more features include features extracted from the structured data of at least one of the error messages pertaining to the issue;
    automatically generating a unique key for the issue based on the features extracted from the error message;
    categorizing the issue as one of an existing issue or a new issue based on an identification of one or more solutions within the knowledge base, wherein the solutions from the knowledge base are identified using the unique key;
    if the issue is an existing issue, then:
       determining scores for one or more solutions in the knowledge base;
       selecting one of the one or more solutions based on a comparison of the scores;
       selecting one or more trained bots for execution of automatic actions corresponding to the selected one of the one or more solutions;
    if the issue is a new issue, then:
       presenting the new issue for solution input from a user;
       creating one or more trained bots for execution of automatic actions associated with the solution based on the user input;
    executing automatic actions associated with the solution via the trained bots, wherein the automatic actions resolve the issue; and
    updating the knowledge base with the solution based on the user input.

11. The method of claim 10 wherein collecting, in a knowledge base, data pertaining to provisioning of orders further comprises:
    gathering unstructured data for issues pertaining to prior order failures from application logs along with identification of one or more of the plurality of applications at which the prior order failures occurred.

12. The method of claim 11, wherein collecting, in the knowledge base, data pertaining to provisioning of orders further comprises:
    gathering data pertaining to a plurality of solutions that were implemented for resolving the issues.

13. The method of claim 11, wherein automatically generating a unique key further comprises:
    composing the unique key from an order number, task name, order type and selected keywords extracted from the error message associated with the issue.

14. The method of claim 11, further comprising:
    generating a dashboard showing successes and failures of the one or more solutions within the knowledge base.

15. A non-transitory computer-readable storage medium comprising machine-readable instructions that cause a processor to:
    receive data regarding an issue arising during processing of an entity through an application stack that includes a plurality of applications wherein each of the plurality of applications affects at least one attribute of the entity and at least a subset of the plurality of applications emit error messages of different formats as unstructured data, wherein the entity pertains to an order for provisioning a cellular service plan and the plurality of applications include an order entry and validation application, an order decomposition application, an order orchestration application, an order provisioning application, an order activation application and an order completion application;

reformulate the error messages emitted by at least the subset of the plurality of applications in the different formats into a common format as structured data;

extract one or more features of the issue from the structured data, wherein the one or more features include features extracted from at least one error message pertaining to the issue;

automatically generate a unique key for the issue based on the features of the issue;

categorize the issue as one of an existing issue or a new issue based on identification of one or more solutions within the knowledge base for resolving the issue;

if the issue is categorized as an existing issue, then:
  determine scores for the one or more solutions in the knowledge base;
  select one of the one or more solutions based on a comparison of the scores;
  select one or more trained bots for execution of automatic actions corresponding to the selected one of the one or more solutions, wherein the solutions from the knowledge base are identified using the unique key;

if the issue is categorized as a new issue, then:
  present the new issue for input from a user;
  create one or more trained bots for execution of automatic actions associated with a solution based on the input from the user; and
  execute automatic actions associated with the solution via the trained bots, wherein the automatic actions resolve the issue.

16. The non-transitory computer-readable storage medium of claim 15, further comprising instructions that cause the processor to:
  capture data fallouts with detailed error messages from the plurality of applications in the application stack.

17. The non-transitory computer-readable storage medium of claim 15, wherein the instructions that execute the automatic actions associated with the solution via the trained bots further comprise instructions that cause the processor to:
  maintain a mapping between existing issues arising in the application stack and corresponding bots that implement actions that resolve the existing issues.

* * * * *